United States Patent
Pollack et al.

[11] Patent Number: 5,925,271
[45] Date of Patent: Jul. 20, 1999

[54] LASER BEAM SHAPING DEVICE AND PROCESS INCLUDING A ROTATING MIRROR

[75] Inventors: Dieter Pollack; Lothar Morgenthal, both of Dresden; Rüdiger Arnold Gnann, Ravensburg, all of Germany

[73] Assignees: Fraunhofer-Gesellschaft zur Forderung der angewandten Forschung e.V., Munich, Germany; Karl H. Arnold, Ravensburg, Germany

[21] Appl. No.: 08/687,570

[22] PCT Filed: Feb. 8, 1995

[86] PCT No.: PCT/DE95/00167

§ 371 Date: Aug. 9, 1996

§ 102(e) Date: Aug. 9, 1996

[87] PCT Pub. No.: WO95/21720

PCT Pub. Date: Aug. 17, 1995

[30] Foreign Application Priority Data

Feb. 9, 1994 [DE] Germany ............................ 44 04 141

[51] Int. Cl.⁶ .................................................. B23K 26/10
[52] U.S. Cl. ................................. 219/121.74; 219/121.8; 219/121.85
[58] Field of Search ......................... 219/121.63, 121.64, 219/121.65, 121.66, 121.73, 121.74, 121.78, 121.79, 121.8, 121.84, 121.85; 359/200, 208, 212, 220, 226

[56] References Cited

U.S. PATENT DOCUMENTS

| | | |
|---|---|---|
| 2,137,286 | 11/1938 | Herbig . |
| 3,663,795 | 5/1972 | Myer .................................. 219/121.68 |
| 4,017,708 | 4/1977 | Engel et al. . |
| 4,328,410 | 5/1982 | Slivinsky et al. .................. 219/121.69 |
| 4,387,952 | 6/1983 | Slusher . |
| 4,667,080 | 5/1987 | Juptner et al. ..................... 219/121.74 |
| 4,689,467 | 8/1987 | Inoue .................................. 219/121.6 |
| 4,797,532 | 1/1989 | Maiorov . |
| 5,293,265 | 3/1994 | Aleshin et al. ......................... 359/200 |
| 5,302,802 | 4/1994 | Fujinaga et al. .................... 219/121.78 |
| 5,303,081 | 4/1994 | Totsuka et al. . |
| 5,430,270 | 7/1995 | Findlan et al. ..................... 219/121.63 |

FOREIGN PATENT DOCUMENTS

| | | |
|---|---|---|
| 011023 | 6/1984 | European Pat. Off. . |
| 0262225 | 4/1988 | European Pat. Off. . |
| 0570152 | 11/1993 | European Pat. Off. . |
| 3939577 | 6/1991 | Germany . |
| 4120905 | 9/1992 | Germany . |
| 4304499 | 9/1993 | Germany . |
| 53-141049 | 12/1978 | Japan . |
| 61-292122 | 12/1986 | Japan . |
| 1-130894 | 5/1989 | Japan . |
| 3-248793 | 11/1991 | Japan . |
| 5-177375 | 7/1993 | Japan . |

OTHER PUBLICATIONS

H. Hügel, "Strahlwekzeug Laser" [Beam Tool Lasers], Verlag B.G. Teubner Stuttgart, pp. 196–206, 1992.
English Language Abstract of JP 61–292,122.

*Primary Examiner*—Gregory L. Mills
*Attorney, Agent, or Firm*—Greenblum & Bernstein P.L.C.

[57] ABSTRACT

The invention relates to a device for laser beam shaping, and in particular to a device for laser beam surface machining. The device includes at least one stationary beam-shaping mirror and at least one rotary mirror that is rotatably supported about a rotational axis and can be selectively driven for rotation. As viewed in the direction of propagation of the laser beam, the at least one static beam shaping mirror is disposed first, followed by the at least one rotary mirror. A perpendicular to a beam deflecting surface of the rotary mirror is inclined at a particular angle relative to the rotational axis by a tapered disc. The tapered disc is fastened to the side of the rotary mirror remote from the laser beam to provide the desired angle of inclination, and the beam deflecting surface of the rotary mirror may be made smooth. One of the stationary and rotary mirrors is configured so that the resulting outline of the beam on the surface to be treated includes an ellipse.

14 Claims, 16 Drawing Sheets

1 CM

LASER BEAM SHAPING DEVICE AND PROCESS INCLUDING A ROTATING MIRROR

BACKGROUND OF THE INVENTION

1. Filed of the Invention

The invention relates to a device and a process in which this device can be used, for laser beam shaping, particularly in laser beam machining of work pieces. The term laser beam machining is understood to mean not only laser beam surface hardening, in particular transformation hardening, but also other laser beam surface machining processes, such as alloying, remelting, cladding, stripping, welding, cutting, and others. The invention can be used in the treatment of metallic, non-metallic, and/or ceramic work piece surfaces in a solid or liquid state.

2. Description of Background Information

It is known that in laser machining, a particular importance is attached to both the quality of the "raw beam" and the beam shaping with which the "raw laser beam" is "shaped" for the desired use, since as a result, the process, quality, quantity, and efficiency have a decisive influence in surface machining. Hence the demand on the one hand, for an optimum "raw laser beam quality" and on the other hand, for focussing or beam-shaping elements (transmission and reflection optics, in particular metal optics) that are adaptable—i.e. that correspond to the "raw beam quality" and the stated machining goal. A decrease of the "raw beam quality" is generally connected with the availability of higher power lasers (>5 kW). Among other things, this means that the power density distribution over the raw beam cross section is uneven, i.e. nonhomogeneous, and means that the beam diameters as a whole increase in size, which means that the optical components and the container diameters for the beam transmitting segments must be enlarged and much more in addition. The availability of beam-shaping elements for larger beam diameters is very limited because of price, optics manufacturing, and power compatibility and at the same time, requires additional measures, e.g. cooling etc., in technical application.

Starting from these disadvantages, the attempt has been made to shape and deflect the laser beam by means of static or dynamic beam-shaping elements or a combination of the two.

All versions of the static beam shaper have the advantage of being suited for higher laser powers, but they are generally blamed for the disadvantages of insufficient power peak compensation and poor flexibility, i.e. can only be used for one operating point (spot measurement). The spot of a static beam shaper, with its shortcomings that have already been discussed, is calculated and produced for precisely defined raw beam parameters, e.g. diameter, divergence, mode image configuration, angle from beam axis to beam shaper axis, deflection angle, among other things. With practical operations, it is determined that all of these parameters are subject to changes of short or long duration. Thus for example, in operations with a number of work stations, by means of different length beam paths alone, deviations from the defined beam parameters occur (illumination of the mirror surface of the static beam shaper) or by means of laser operating state changes because of service life (changing of the decoupling disk; soiling of the internal laser mirror). In laser material machining, these changes cause qualitative differences in the work piece, which finally have a negative influence on the work result so that the aim is to counteract these changes by means of costly additional measures, e.g. installation of telescopes, adaptive optical elements, coupled with sensory mechanisms and regulation, etc. A certain power peak compensation takes place with dynamic beam shapers, e.g. scanner mirrors. These have the shortcoming, though, that in general, they can be used only in a laser power range of up to a maximum of 5 kW, where the geometric distribution of the beam intensity in the spot (power peaks, beam nonhomogeneities, etc.) are evened out (homogenized) on the work piece surface. The power excesses (nonhomogeneities) dictated by principle at the turnaround points of the scanner mirror, e.g. on the right and left edge of the track in one-dimensional scanning, are likewise transmitted to the work piece in surface machining and impair (limit) the laser machining process in a very disadvantageous manner, particularly in the case of conversion hardening.

To eliminate these disadvantages, a combination of a static and a dynamic beam shaper was attempted with the embodiment represented in DE 41 20 905.

The disadvantage of this embodiment is comprised in that for one thing, it can only be used for laser beam cutting, and this has to be operated exclusively in focus, and operations in high speed regions of the second rotary mirror are precluded. A further disadvantage of this embodiment is that it is not variable on the mirror end. In this instance, only one respective mirror can be used for precisely one application. A different use requires a different mirror. One reason for the disadvantages mentioned here is that in this case, the condition of maintaining an orthogonal axis system must be fulfilled.

An improvement to this effect is disclosed by DE 39 39 577, in that this condition of the orthogonal axis system does not exist here. In the embodiment shown in DE 39 39 577, the combination of the static beam shaper with the dynamic beam shaper is likewise attempted. According to the invention, in the embodiment of DE 39 39 577, the dynamic beam shaper is a mirror that has a helical surface as the beam-deflecting mirror surface and its rotational axis is the rotational helix axis of the helical surface.

This embodiment shown in DE 39 39 577 has the disadvantage that because of the non-passable beam-deflecting mirror surface (edges, at least one step) of the mirror there according to the invention, at least one unsteadiness occurs in the beam deflection; this embodiment also has the disadvantage that indefinite scattering effects are recorded at the edges. On the other hand, with this embodiment, the costly mirror production is disadvantageous, which is further intensified by the fact that in the event of beam deflection variation, the mirror always has to be replaced in accordance with the desired beam deflection.

Furthermore, the embodiment according to DE 39 39 577 has the disadvantage that a definite deflection cannot be produced with this device. This is based on the fact that on a helical line, like the one forming the basis for the mirror of the device from DE 39 39 577, various concave curvatures are differently deflected with regard to the radius in the exposed area, at least in part of the exposed area. As a result, a reflection distortion is inevitably produced because a focus cannot be achieved over the entire width of the beam.

Finally, this embodiment is further disadvantageous in that the beam-deflecting mirror surface of the mirror according to the invention shown in DE 39 39 577 is not passable because of the realization of the rotational shaft, etc. This results in the fact that the laser beam cannot be guided over the entire, theoretically possible beam-deflecting mirror surface, which in turn leads to the fact that the mirror face that is quasi available for "use" is subject to a comparatively higher load.

Furthermore, U.S. Pat. No. 4,797,532 describes a device for laser beam shaping in laser beam surface hardening. The embodiment shown in U.S. Pat. No. 4,797,532 for laser hardening has among other things a fundamental fault in the mirror disposition. The attainment of the object of disposing the rotary mirror in front of the focussing mirror means that the laser beam to be focussed strikes the focussing mirror with constant angular deviations, by means of which considerable reflection errors and astigmatisms are produced. According to H. Hügel, Strahlwerkzeug Laser, [Beam Tool Lasers], Verlag B.G. Teubner, Stuttgart, 1992 (ISBN 3-519-06134-1) p. 200, astigmatism occurs whenever the beam to be focussed constitutes an angle to the axis of the optics; but this is fundamentally the case in U.S. Pat. No. 4,797,532. Due to these disadvantageous changes of beam properties, usable focussing can no longer be assured and due to principle, the goals sought cannot be achieved or can only be achieved in an incomplete manner.

It is furthermore disadvantageous in U.S. Pat. No. 4,797,532 that the devices for laser beam shaping are very large and heavy in their dimensions. Even drive embodiment for transferring the rotational movement from a separate motor to a compact bearing housing via belt drive takes up space and is heavy. The bearing housing with the rotary mirror, a further automatic subassembly, has handles and adjusting screws to be manually operated, by means of which balance errors are produced, which severely limit the speed range that can be used.

Because of the disposition of the rotary mirror in front of the focussing mirror, the diameter of the focussing mirror must be much greater than results from the laser beam diameter actually used. Possibilities for cooling the rotary mirror and protecting it against soiling are not discussed.

SUMMARY OF THE INVENTION

Consequently, the object of the invention is to propose a device for laser beam shaping, particularly in laser beam surface machining, which can be used flexibly and is open to a large range of intended use.

A further object of the invention is to develop a device of the kind mentioned in which beam-shaping elements are used which are readily available, can be produced without great expense, and are thus also reasonably priced.

An additional object of the invention is to propose a device of the type mentioned in which beam-shaping elements can be used which do not cause unsteadinesses in the beam deflection and do not result in indefinite scattering effects.

Furthermore, another object of the invention is to disclose a device of the type mentioned, which does not have all the disadvantages of the prior art shown and in which the surfaces of the beam-shaping elements used, which surfaces are struck by the laser beam, are not subjected to any higher load than is inevitable.

A further object of the invention is furthermore comprised in proposing at least one possible process in which the device according to the invention is advantageously used and in which as a result, the disadvantages mentioned in the prior art do not occur.

An additional object of the invention is to furthermore disclose possible uses of the proposed device and the proposed process.

The device for laser beam shaping, particularly in laser beam machining, includes at least one static, beam-shaping mirror and at least one rotary mirror that is rotatably supported and can be driven to rotate, where viewed in the laser beam direction, the static, beam-shaping mirror is disposed in front of the rotary mirror. One version of the device provides that only one static, beam-shaping mirror and one rotary mirror, respectively, are used. According to the invention, with the proposed device, the perpendicular to the beam-deflecting surface of the rotary mirror, which can also be described as the normal to the beam-deflecting surface of the rotary mirror, is tilted by a particular angle in relation to the rotational axis. It must be taken into consideration for each intended use that the question of whether the reflection of the laser beam on the specimen, which can also be called the effective area of the laser beam on the specimen, is a circle, an ellipse, or in the borderline case, a line, can be regulated via the angle of incidence of the laser beam onto the specimen. This effective area is a circle when the angle of incidence of the laser beam=0 and is an ellipse when the angle of incidence of the laser beam>0. As is known, the axial ratio of this ellipse is a function of the magnitude of this angle of incidence and this ellipse becomes more linear as the angle of incidence of the laser beam increases.

With a constant reflection length, the size of the effective area of the laser beam on the specimen is then determined by the magnitude of the angle by which the normal of the beam-deflecting rotary mirror surface is tilted in relation to the rotational axis. A large tilt angle produces a large effective area.

With the embodiment according to the invention, in another version, the effective area of the laser beam on the specimen can be changed if for example the prefocussed laser beam strikes the surface of the rotary mirror, not having its optical axis in the axis center (point of rotation) and/or not having it at an angle of 45°. These possibilities can be additionally used in order to be able to adjust other variations of the effective area (shape and size) of the laser beam on the work piece.

For example, the static, beam-shaping mirror can be a focussing mirror with a focal length of 400 mm, preferably for remelting, while in welding it is more favorable to work with shorter focal lengths of 150 mm, for example. The static beam shaping, though, can also be carried out with linear focusing mirrors (facetted mirrors), with which, for example, a linear focus can be produced, which can be advantageously used in remelting. However, elongated beam spot geometries with axial ratios of for example 10:1 can also be produced, with which hardening and in particular hardening with wide tracks can be carried out (for example a width of 50 mm with 5 kW of laser power). For surface machining, it has furthermore turned out to be advantageous that the dimensions of the effective area can be additionally adjusted by changing the spacing of the rotary mirror in relation to the surface of the specimen. Consequently, with a beam-shaping mirror, a large number of spot sizes are possible without the mirror replacement that is otherwise required. Beam-shaping mirrors can be arbitrary mirrors or combinations, which are determined in particular by the stated machining objective.

Furthermore, with the device according to the invention, the beam-deflecting surface of the rotary mirror is embodied as unstructured. This means that this surface is smooth and has no edges, steps, or the like.

For the case in which the rotary mirror has no beam-shaping functions to fulfill, it is advantageous if the beam-shaping surface of the rotary mirror is flat, that is, not convex or the like. For this instance, it is advantageous to use conventional flat mirrors. However, if the rotary mirror has additional beam-shaping functions to fulfill, it should be shaped in accordance with the beam-shaping function, e.g. convex.

The device according to the invention also provides for the variant that in addition to its own function, the rotary mirror also has to fulfill the additional function of complete beam shaping. In this case, the static, beam-shaping mirror can be completely eliminated, which can be advantageous for particular intended uses, e.g. a hardening of inner pipe walls.

The device according to the invention can be used advantageously with high and low laser powers. With laser powers>1 kW, though, it has turned out to be advantageous to use metal mirrors as the static, beam-shaping mirror or as the rotary mirror; these mirrors can be clad or unclad. It has turned out to be particularly favorable to use conventional clad or unclad copper mirrors. In a concrete application, it can also be advantageous to use clad or unclad aluminum mirrors.

With the device according to the invention, it is conceivable in principle to use a mirror as the rotary mirror, which is shaped in accordance with its existing or non-existent beam-shaping function and which is embodied for each corresponding intended use so that the required tilt angle of the normal of the beam-shaping rotary mirror surface in relation to the rotational axis is set by the embodiment of the rotary mirror. However, this involves the disadvantage that different mirrors must be used for different tilt angles. Therefore, with the device according to the invention, conventional mirrors are advantageously used as the rotary mirror, which are shaped in accordance with their existing or non-existent beam-shaping function and a tapered disk or a tapered ring, which is shaped in accordance with the desired tilt angle and is dimensioned in accordance with the size of the rotary mirror, is attached to the side of the rotary mirror remote from the laser beam, i.e. the underside of the rotary mirror, in order to attain the tilting of the normal of the beam-shaping rotary mirror surface, which tilting is required for the respective application. It is advantageous to fasten this tapered disk or tapered ring to the underside of the rotary mirror so that at any time, it can be removed or exchanged for a different tapered disk or tapered ring that corresponds to a different tilt angle. As a result, it is assured that one and the same conventional rotary mirror can be used for many intended uses of the device according to the invention. Since the required tapered disks or tapered rings are essentially simpler and less complex in production, and in the event that an intended use requires a change of the tapered disk or tapered ring, the beam-deflecting mirror surface is not loaded under any circumstances and consequently cannot be damaged, by means of this, a significant simplification and savings are achieved in comparison to the devices of the prior art. Because of its function, it is advantageous that the rotary mirror is rotationally symmetrical.

To broaden the potential application range of the device according to the invention, it is favorable to provide devices for cooling both the static, beam-shaping mirror(s), and the rotary mirror(s). Consequently, the device according to the invention is also not excluded from being used in a laser power range of 0.8 kW and up.

For the attainment of the object according to the invention, besides all types of electric motors, the use of hydraulically driven, but in particular pneumatically driven turbines with a speed of 10 rpm and up, are seen as advantageous as the drive for the rotating movement of the rotary mirror since as a result, the range of the rotary mirror rotation speed required for the respective application is broadened from approx. 10 rpm to approx. $10^5$ rpm, without having to change the drive for the rotary mirror rotation.

The proposed compact design of drive, bearing, receptacle, tapered ring or tapered disk, and rotary mirror assure a minimal space requirement and a low mass. At the same time, it assures the required handling for adjusting the taper angle; but as the last subassembly of the beam guidance and beam shaping for the machine component being dealt with, it also assures the robustness required in most numerically controlled work stations.

The use of a pneumatically driven turbine is advantageous, particularly when high speeds of the rotary mirror are required. The necessary speed of the turbine itself, which speed is to be adjusted, depends upon the concrete machining objective, e.g. in laser beam surface hardening, a turbine speed of 4,000 to 5,000 rpm is advantageous, however in welding, with an advancing motion of 10 m/min, speeds of 50,000 rpm are required. Even if the drive is carried out by an electric motor, the adjusted speed of the turbine can advantageously be kept constant through a suitable control or predetermined speeds can be called up, e.g. by means of the numerical control of the work station. It must be taken into consideration, though, that the speed of the turbine does not absolutely have to correspond to the speed of the rotary mirror, e.g. if a gearing is connected between the rotary mirror retainer and the turbine. The same is also true if the drive is carried out for example by means of an electric motor.

It is furthermore advantageous to use a compressed air-driven turbine as the drive for the rotational movement of the rotary mirror, since as a result, a soft, elastic drive with a large adjustment range is produced and the routing of the compressed air can be embodied so that at the same time, the optical components (mirror, etc.) can be protected against particle buildup and can be cooled at the same time. The rotary mirror is already protected against soiling and particle buildup because of its rotation; its effectiveness increases at higher speeds. Because of this kind of self-cleaning, the rotary mirror and hence the entire process as well attains a longer service life and greater stability; in particular, the rotary mirror is the optical component that is most at risk since it is the most closely associated with the exposure zone. Research has determined that the service life of laser mirrors can be considerably lengthened by means of rotation alone (reduction of particle buildup and soiling). The constructive embodiment of the entire device, which is adapted to the respective application, is determined by means of the spaces from the static, beam-shaping mirror to the rotary mirror or vice versa, from the tapered disk angle, the focal length of the beam-shaping mirror and of the defocussing, which is determined by the desired spot profile.

The process for laser beam shaping, particularly in laser beam surface machining, in which the device provides for the laser beam to be guided from the laser beam source to the surface of the specimen to be machined, via a mirror system includes at least one static, beam-shaping mirror and at least one rotary mirror that is rotatably supported and can be driven to rotate. According to the invention, during laser machining, the perpendicular to the unstructured, beam-deflecting surface of the rotary mirror is tilted by a particular angle that is a function of the intended use and the rotary mirror is rotated at a speed of >10 rpm, e.g. by means of a turbine. The laser machining can be carried out lengthwise or crosswise to the greater axis of the spot (spot axis).

With a laser power>0.8 kW, the mirrors being used should be advantageously cooled.

It is advantageous if the speed of the rotary mirror changes during laser machining and is adapted for optimization reasons to the respective machining objective, e.g. material abrasion. Thus, for example, at the beginning of machining, the speed of the rotary mirror could be lower and when heat is produced by the continuation of the machining, this speed can be higher, which is of interest for example in plasma machining.

Furthermore, it is favorable if the angle by which the beam-deflecting surface of the rotary mirror is tilted in relation to the rotational axis is changed in accordance with the respective machining objective, which can be carried out in a perfectly continuous manner during operation of the rotary mirror, for example by changing the tapered disk or the tapered ring. This change of the tilt angle can be carried out with a constant speed of the rotary mirror or, if it should be required, with a simultaneous changing of the rotary mirror speed.

As already described above, the tilting of the beam-deflecting surface of the rotary mirror can be advantageously achieved by means of a tapered disk or tapered ring that is shaped and embodied specifically for the intended use, is preferably made of metal, for example aluminum, copper, or brass, and can be fastened in an interchangeable manner.

Balance errors possibly caused by the tapering can be eliminated as follows:

with the tapered disk, by "balancing", i.e. measurements for truing and purposefully positioned bores being let in until no further imbalance can be determined.

with the tapered ring, by first decreasing the mass (disk to ring) and second, eliminating the remaining imbalance by letting in indentations (recesses) that are calculated ahead of time and mill-cut to purposefully fixed depths. Since each tapered ring has a different tapering, exchanging or presetting the tapering solves the balancing problem.

A preferred use of the device according to the invention and of the process according to the invention is the laser beam surface hardening of inner pipe walls or the laser beam surface hardening of components, preferably laser beam surface hardening of large components in which a gas or solid-state laser is used.

Another preferred use of the embodiment according to the invention is comprised in the potential for its use in laser beam welding.

The attainment of the stated objects, which is described above and attained according to the invention, stands out by virtue of the fact that all the disadvantages mentioned in the prior art do not arise when it is used.

With the embodiment according to the invention, a device and a process of the type mentioned are proposed, which can be employed in a flexible way, can be produced using a simple design, and are reasonably priced. The invention is very well suited for every laser beam transmission system and in particular, also for higher laser powers, even for laser powers>10 kW.

As a result of the beam shaping according to the invention, beam movements are produced on the work piece surface to be treated, that is moved in the advancing direction; which beam movements have the shape of cycloids. By combination and variation of the adjustment parameters, various cycloid shapes can be adjusted, mathematically pre-calculated, and used in this way for surface machining. Beam oscillations with intensity distributions on the surface of the specimen that are almost arbitrary from a mathematical standpoint can be set in particular by superposing the advancing speed, beam spot diameter, deflection (taper angle), and rotary mirror speed. Its obviousness must be judged with a view to each respective stated object to be attained.

By using the proposed embodiment according to the invention, a homogenizing of the laser beam or its power density distribution is achieved, which for example also prevents local overheating of the surface of the specimen to be machined during the laser treatment. By using the invention, it is furthermore possible to simultaneously produce spot profiles optimally adapted for the machining objective and to also keep these varied spot profiles stable with simple technical means. It is of no importance whether the laser machining is carried out in CW operation or in pulse operation. The simple design of the device according to the invention which is realized here with the combination turbine and the tapered disk or tapered ring that is attached to the rotary mirror on its end face permits the production of widely varying spot profiles by means of simple changes of the work spacing, which spot profiles can be adapted to the desired surface machining and can be preselected and set.

The versions of the embodiment according to the invention, which are used in the concrete application, depend among other things upon the stated machining objective and the handling system (e.g. robotic, CNC-controlled machines, etc.) to be used in the concrete application. An optimization can be carried out by means of a suitable software.

Furthermore, with the use of the embodiment according to the invention, it turns out to be advantageous that a large work spacing (spacing from optics to component) can be achieved, which brings with it an increase in the service life of the optical components. Moreover, by means of the beam deflection according to the invention (deflection by means of rotary mirror, tapered disk or tapered ring, and turbine), it also becomes possible to make laser machining with "plasma coupling" (laser power densities of $10^5$ W/cm$^2$), which up to now could only be generally used for very small spot area, usable for larger track widths as well, but ones where greater work spacings can also be maintained.

Through the use of the proposed embodiment, the stated objects are attained, the range of intended use is significantly increased, and advantages such as blurring of local intensity peaks (hot spots) in the laser beam spot (e.g. in beam focussing or beam shaping with faceted mirrors), influencing the melting bath dynamics in fluid phase processes (prevention of bubbles in remelting of cast), or enlarging the keyhole in laser welding (gap bridging) can be achieved.

These advantages could not be achieved with the prior art.

The embodiment according to the invention achieves a smoothing and evening out of laser power peaks over the area of the spot (machining surface) and as a result, makes it possible to prevent melt-ons and to purposefully produce power profiles desired in the process.

Because of the possibility of rapidly moving the beam of particularly high-powered lasers, by means of the device according to the invention (rotary mirror with tapered disk or tapered ring and turbine or also the combination rotary mirror with tapered disk, turbine, and static, beam-shaping mirror connected in front or behind it), local power excesses in the spot are reduced and in addition, a wide variety of spot profiles are produced, which could not be embodied with the prior art or could only be embodied at very high expense.

The embodiment according to the invention is explained in detail in the following exemplary embodiments.

BRIEF DESCRIPTION OF THE DRAWINGS

The above and other features and advantages of the present invention will be made apparent from the following description of the preferred embodiments, given as non-limiting examples, with reference to the accompanying drawings in which.

DETAILED DESCRIPTION OF THE PREFERRED EMBODIMENTS

First Exemplary Embodiment

Figure 2:
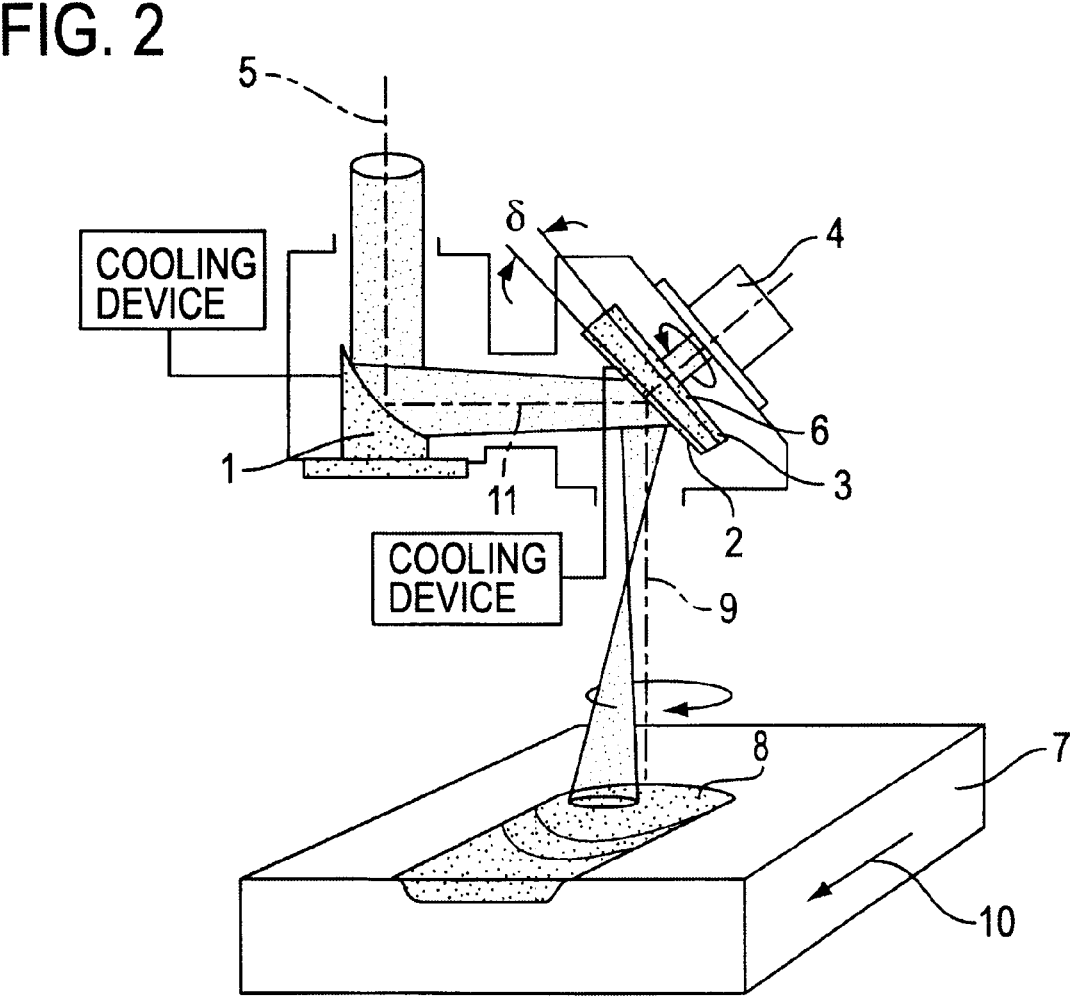
FIG. 2 shows the version of the device in which the static, beam-shaping mirror 1 is disposed first, followed by the rotary mirror 2.

According to FIG. 2, the beam 5 of a laser (laser power>10 kW) is guided into the device and in it, first strikes a static, beam-shaping copper mirror 1 that is installed in a fixed manner and is water-cooled, where the beam is pre-focussed. From there, the laser beam 5 is guided directly to a rotary mirror 2, which is likewise made of copper, can be water-cooled, and whose beam-deflecting surface is unstructured and flat, and is reflected from there directly onto the specimen 7. The rotary mirror 2 is rotatably supported and can be driven to rotate and is attached by means of screws and nuts to the tapered disk 3 disposed on its underside, but can be exchanged at any time. Consequently, the normal of the beam-deflecting surface of the rotary mirror 2 is definitely tilted by the angle 6 in relation to the rotational axis. The magnitude of the tilt angle 6 depends on the desired effective area of the laser beam 5 on the specimen 7 to be treated. The principle is true that the greater the tilt angle δ, the larger the effective area of the laser beam 5 on the specimen 7.

The combination rotary mirror 2/tapered disk or tapered ring 3 is finally secured in a receptacle 6, which is coupled via a shaft to a turbine 4 (5,000 rpm), so that the rotary mirror can be moved in continuous rotation with its normal of the beam-deflecting surface tilted in relation to the rotational axis. In the present example, the rotary mirror 2 is rotated at 4,000 rpm. The space 11 between the two mirrors 1, 2 is adjusted in accordance with the desired effective area and the desired effective profile, which are expressed in the spot 8, in combination with the advancing motion 10 and the attendant work spacing 9.

Figure 1:
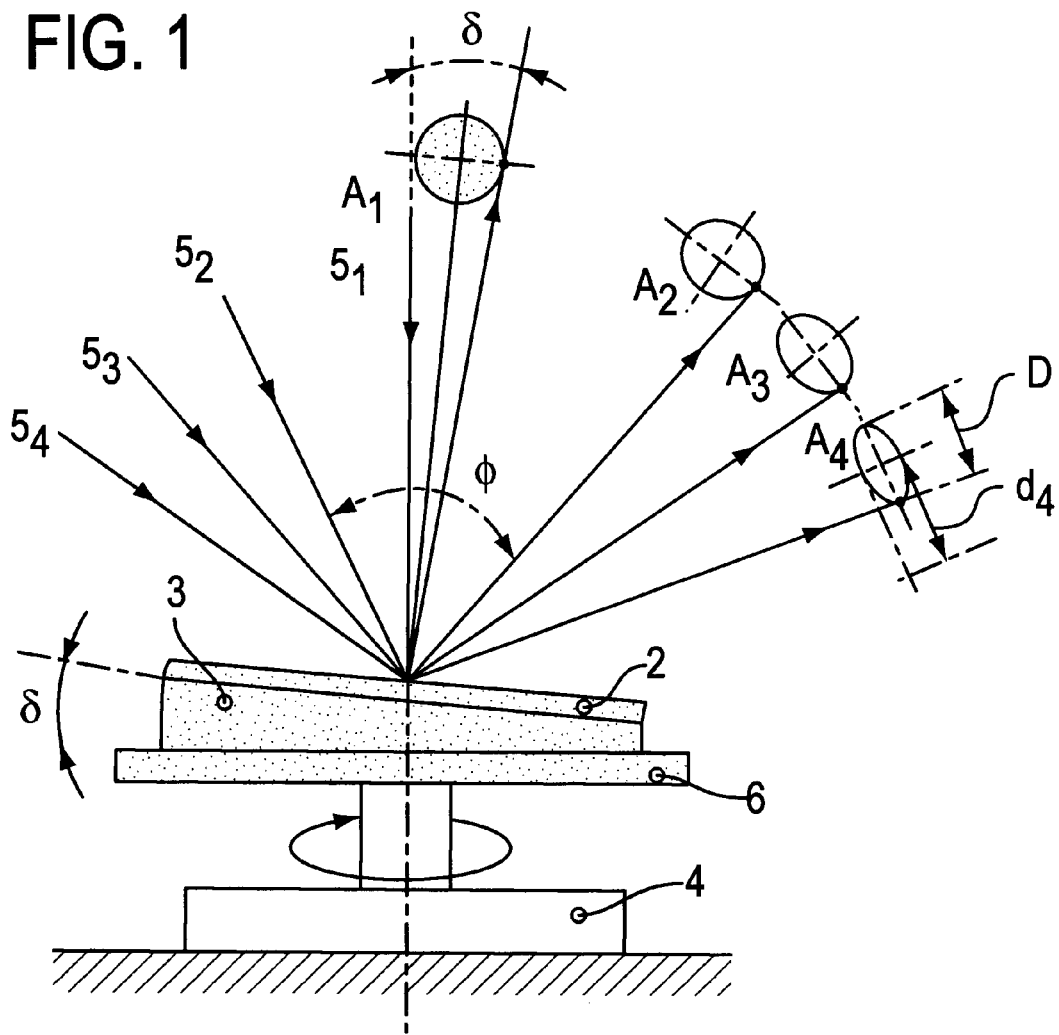
FIG. 1 shows the spot influence by means of the deflection angle φ.

It should also be noted that the effective area of the laser beam 5, also called spot 8, is strongly influenced by the deflection angle φ in the event of small laser beam diameters to be used here (see FIG. 1). The angle δ represents the tilt angle of the normal of the beam-deflecting surface of the rotary mirror in relation to the rotational axis; this angle is also called the taper angle.

By changing angle φ see FIG. 1), the greater ellipse axis (D), whose length results from the image spacing multiplied by 4 δ, remains unchanged and the respective lesser ellipse axis ($d_{1-4}$) changes as shown in FIG. 1. Table 1 below shows the axial ratios $D/d_{1-4}$ resulting from this.

TABLE 1

Figure 3:
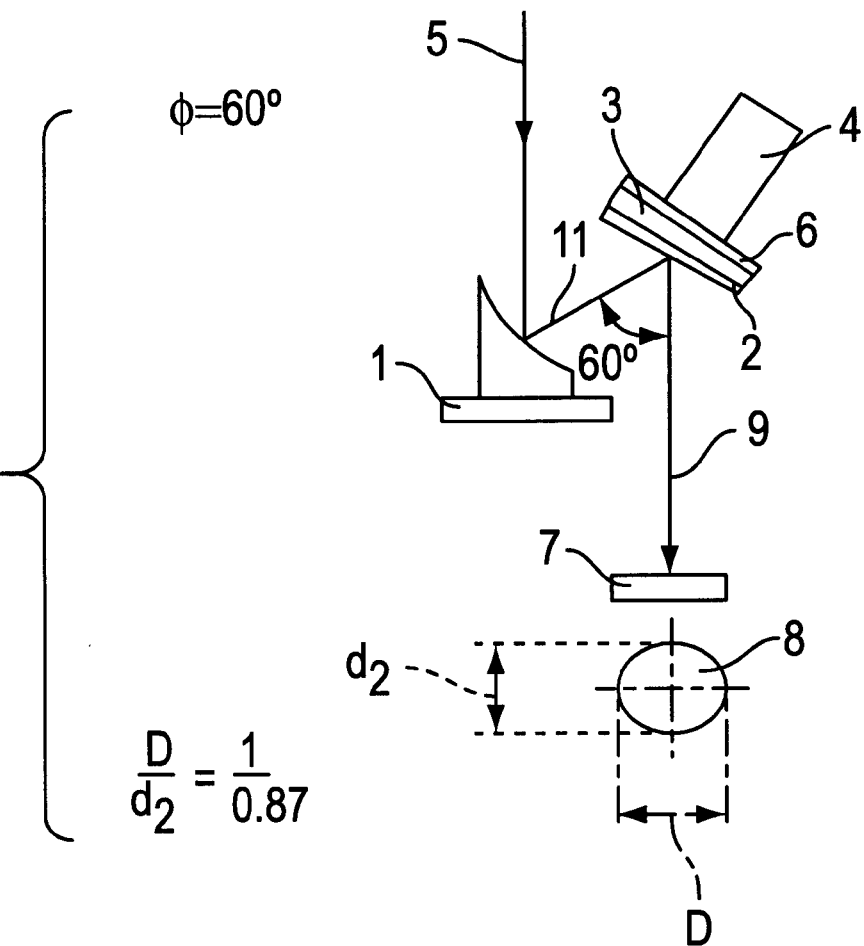
FIG. 3 shows the version of the device in which the static, beam-shaping mirror 1 and the rotary mirror 2 are disposed so that the deflection is carried out at the angle of φ=60°.
Figure 4:
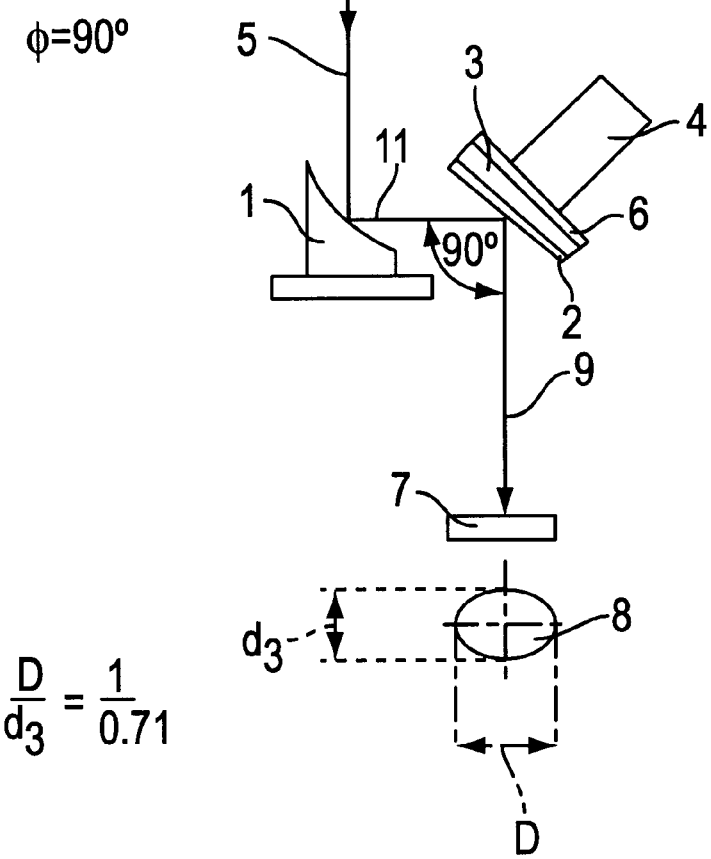
FIG. 4 shows the version of the device in which the static, beam-shaping mirror 1 and the rotary mirror 2 are disposed so that the deflection is carried out at the angle of φ=90°.
Figure 5:
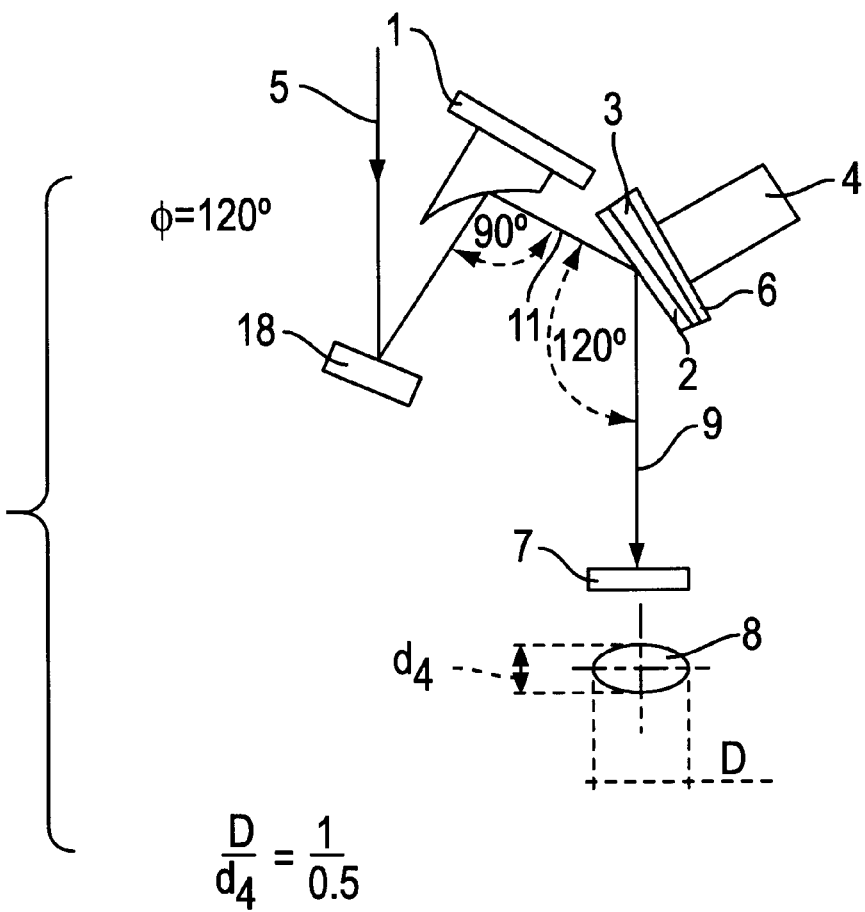
FIG. 5 shows the version of the device in which the static, beam-shaping mirror 1 and the rotary mirror 2 are disposed so that the deflection is carried out at the angle of φ=120°.

| axial ratio of the ellipse produced, which is yielded by cos Φ/₂. | | |
|---|---|---|
| deflection angle Φ in degrees | axial ratio D:$d_{1-4}$ | principle embodiment |
| 0 | 1:1 | |
| 60 | 1:0.87 | see FIG. 3 |
| 90 | 1:0.71 | see FIG. 4 |
| 120 | 1:0.5 | see FIG. 5 |
| 135 | 1:0.38 | |

FIGS. 3 and 5 show how the beam guidance can be embodied in machining heads, if a particular deflection angle φ and thus a particular axial ratio D/$d_i$ in the spot should be used for laser machining. The incoming perpendicular laser beam 5 is reflected by the static, beam-shaping mirror 1 via the rotary mirror 2, which includes the selected taper angle δ and the speed n, by using the desired deflection angle φ, and with the work spacing 9 to be adjusted, is reflected once more perpendicular to the specimen surface 8, the axial ratio of the spot 7 being a function of the deflection angle φ. Segments 11 and 9, the spacing between the static, beam-shaping mirror 1 and the rotary mirror 2 or between the rotary mirror 2 and the specimen surface 8 are each the same length in FIGS. 3 to 5. As the greater segment in comparison to the spacing 11, the work spacing 9, already offers a certain protection against particle buildup and soiling by means of its greater length, in particular for the rotary mirror, which in the event of laser exposition of the specimen 8, is the optical element most at risk. An additional, particularly effective protection is produced in the proposed embodiment by the rotation of the rotary mirror. With the embodiment proposed here, treatments with plasma coupling on specimens made of the material C15 could be carried out, wherein the adjusted spacing 9 was only 100 mm, without being able to detect visible soilings of the rotary mirror.

In laser surface hardening of a wide variety of specimens, defined hardness profiles and effective areas of laser beams can be adjusted and varied with no trouble using the device proposed here.

Second Exemplary Embodiment

Figure 6A:
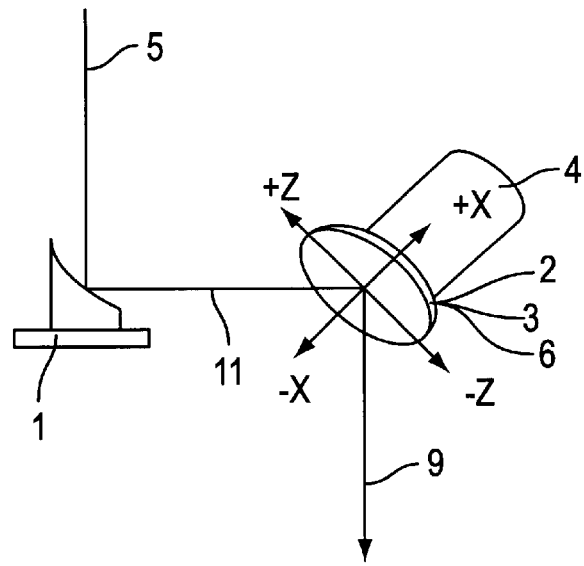
FIG. 6a shows the version of the device in which the spot on the surface of the specimen is adjusted by moving the rotation point of the rotary mirror 2 toward the laser beam 5 striking it.
Figure 6B:
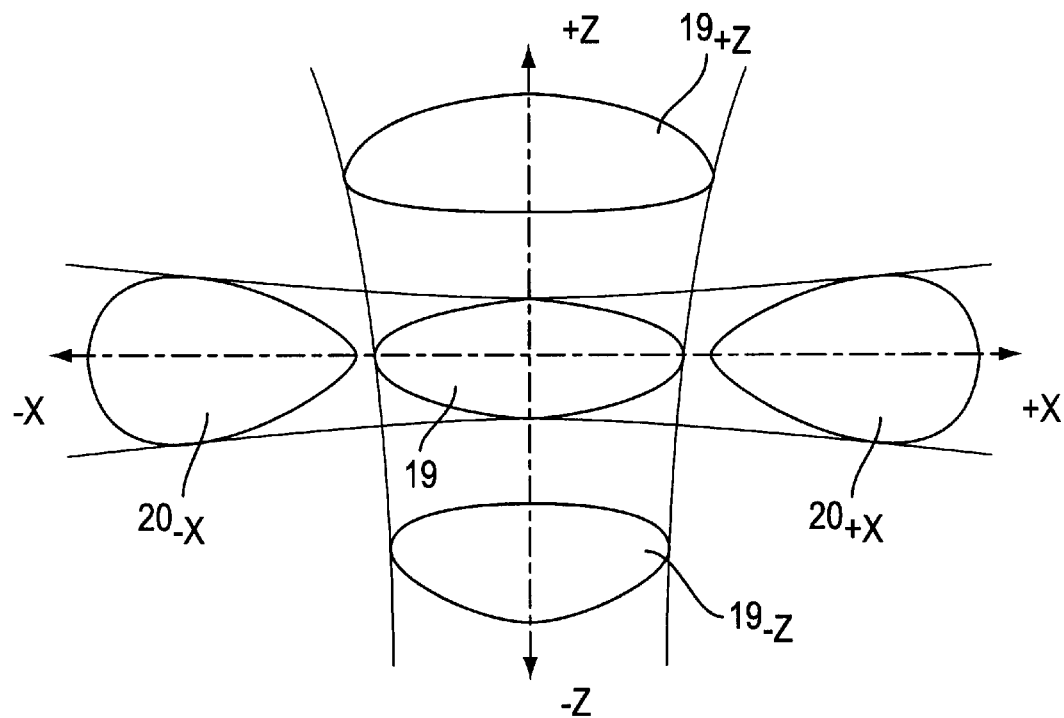
FIG. 6b shows the results that can be achieved with the spot adjustment according to version 6a of the device.

FIG. 6a describes a further possibility for adjusting the desired effective area (spot) of the laser beam on the specimen surface. While FIG. 6a explains the principle, with FIG. 6b, the resulting effects of potential adjustments on the specimen surface are described with FIG. 6b. In FIG. 6a, the laser beam 5 strikes the beam-shaping mirror 1 in a perpendicular fashion and is reflected with the deflection angle $\phi=90°$ onto the rotary mirror 6, which is carried by the compact rotation device 2, 3, and 4 (also see FIG. 1). Normally, it is assumed that after passing through the partial segment 11 at the angle of 45° in the axis center (rotation point), the central axis of the laser beam 5 strikes the surface of the rotary mirror and from there, the specimen surface is exposed to the beam with the work s pacing 9. Averaged over a time greater than the rotation time of the rotary mirror, the beam spot thus produced is an ellipse with the greater ellipse axis of $D=2*(/\text{segment } 9/)*\tan 2*\delta/60$ and the lesser ellipse axis of $d=0.71\ D$ at $\phi=90°$. The associated beam spot shape is shown as ellipse 19 in FIG. 6b. If the rotary mirror with its compact rotary deice is moved in direction +Z or in direction −Z by an amount c, where the movement direction can be seen in FIG. 6a, the dimensions and geometry of the ellipse 19 change to a spot shape of the effective area $19_{+Z}$ or $19_{-Z}$ as shown in FIG. 6b. The greater axis of the effective area $19_{+Z}$ is then yielded according to $D_Z=(/\text{segment } 9/*4\delta)+(2*\sqrt{2}*c\delta)$ When moved in the −Z direction, the dimensions and geometry of the ellipse 19 change to effective area $19_{-Z}$. The greater axis $19_{-Z}$ is then calculated according to $D_Z=(/\text{segment } 9/*4\delta)-(2*\sqrt{2}*c\delta)$. This means that the dimensions of the elliptical effective areas become smaller by the amount c with a movement in the −Z direction and become larger by the amount c with a movement in the +Z direction. Other changes of the effective area are produced when the rotary mirror axis center is moved in the direction +X or −X, as shown in FIG. 6b with $19_{+X}$ and $19_{-X}$ respectively. Other combinable changes of dimensions and geometry can be set with the simultaneous movement in the X and Y direction.

Dimensional and geometric changes produce location and time changes of the intensity acting upon the specimen surface. Additional intensity influences on the effective area can be adjusted with the embodiment according to the invention.

Third Exemplary Embodiment

The beam shaping for welding with laser beams according to the invention is described in exemplary embodiment 3. In comparison to conventional welding with laser beams, the stated goal or advantages in welding by using the rotary mirror optics proposed according to the invention are:

1. The production of wider welds, e.g. for gap bridging, with comparatively less speed loss in comparison to conventional weld widening by means of defocussing.
2. Welds with a smaller number of pores and with smaller pore size (better degassing by means of an enlarged keyhole).
3. A greater adjustment range and broadened welding parameters (variation range) in comparison to conventional welding with laser beams, by means of which improved (optimized) welds are possible with greater adaptation of the beam parameters to particular welding objectives.
4. The use of higher laser powers for welding at high advancing speeds (high speed welding) through the influence of the keyhole dimensions.
5. Welding with better exploitation of energy.

Figure 7A:
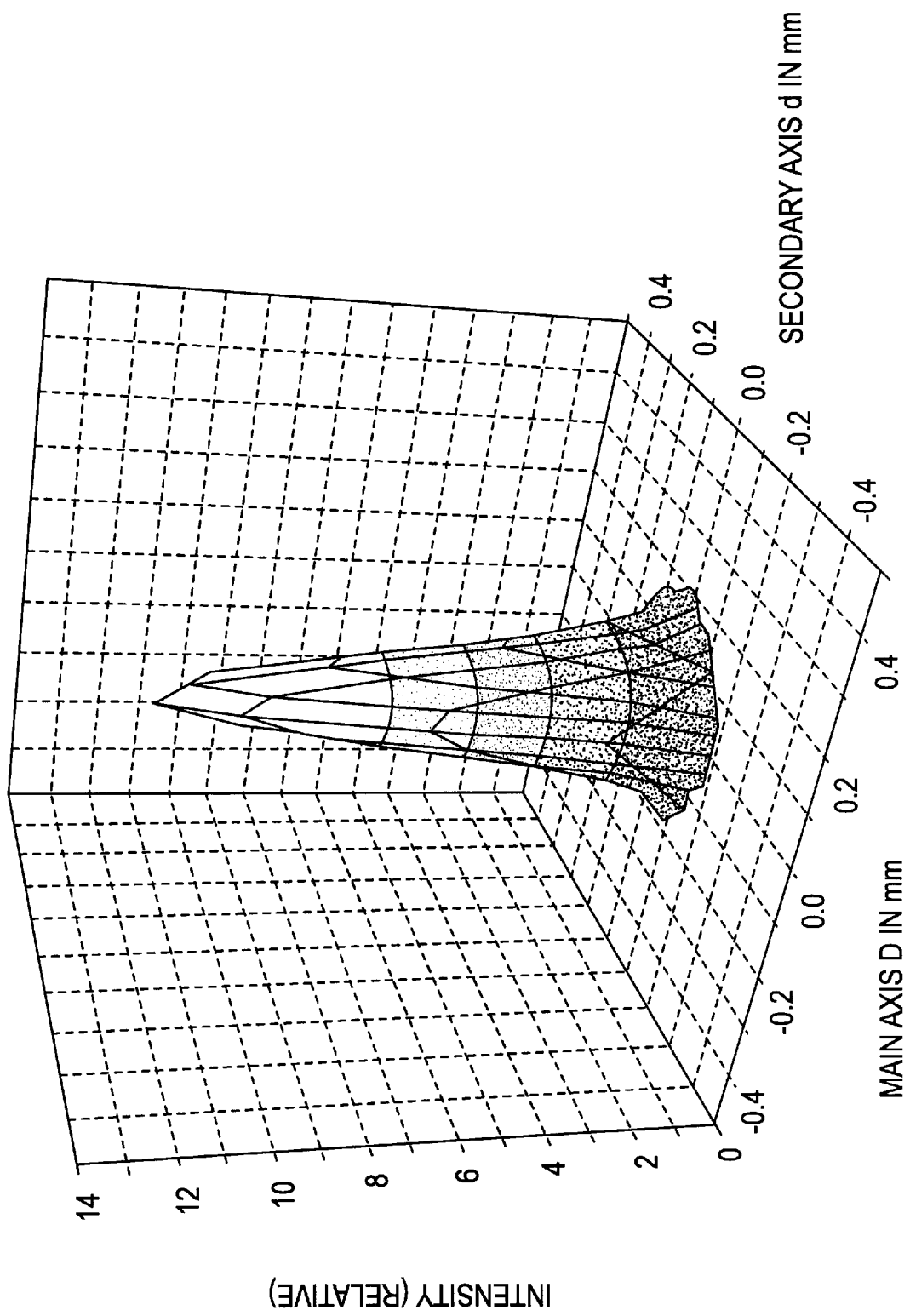
FIGS. 7a to 7c show the results that can be achieved with the spot adjustment for welding, starting with a Gauss intensity distribution with an advancing motion of zero.
Figure 7B:
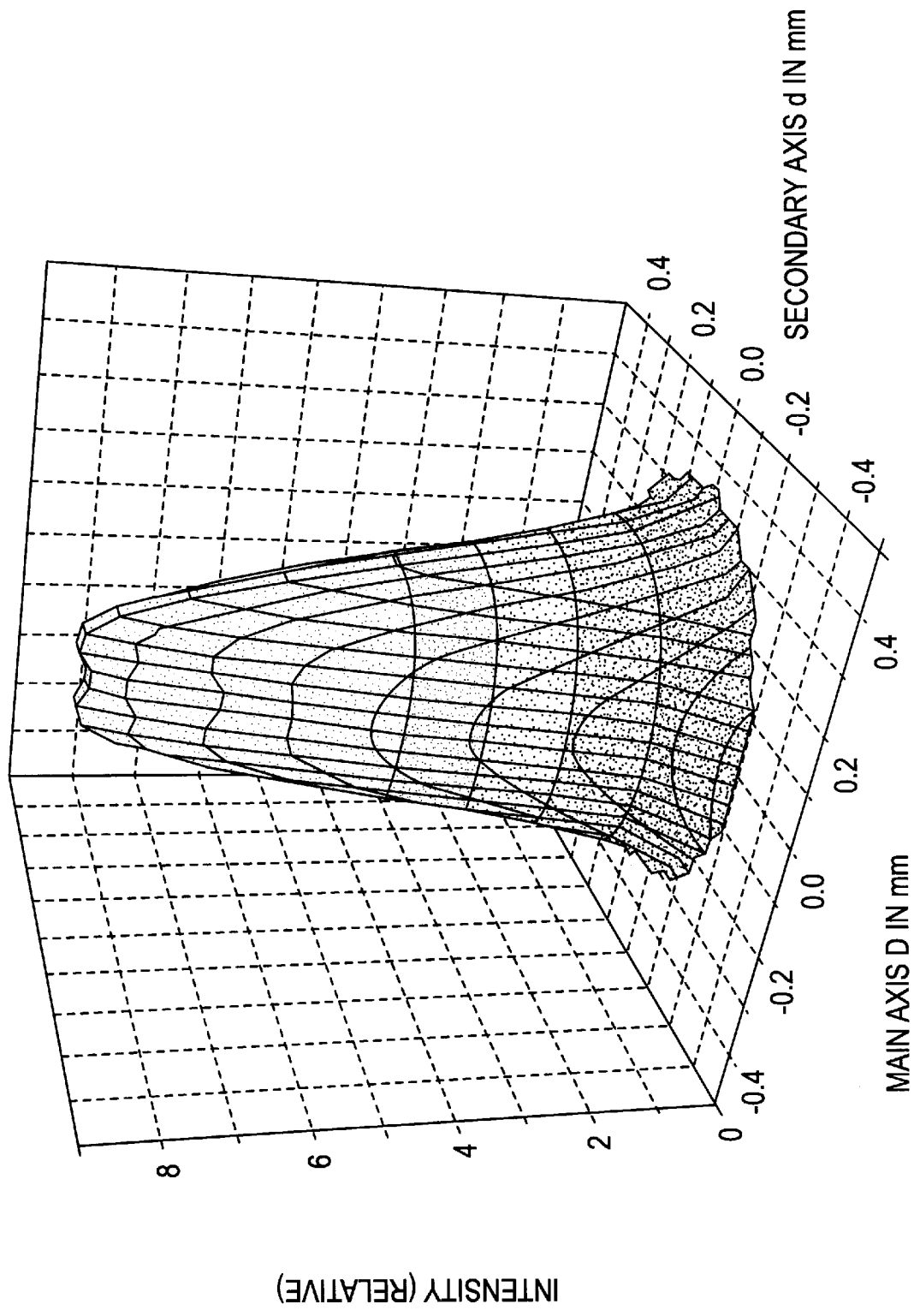
Figure 7C:
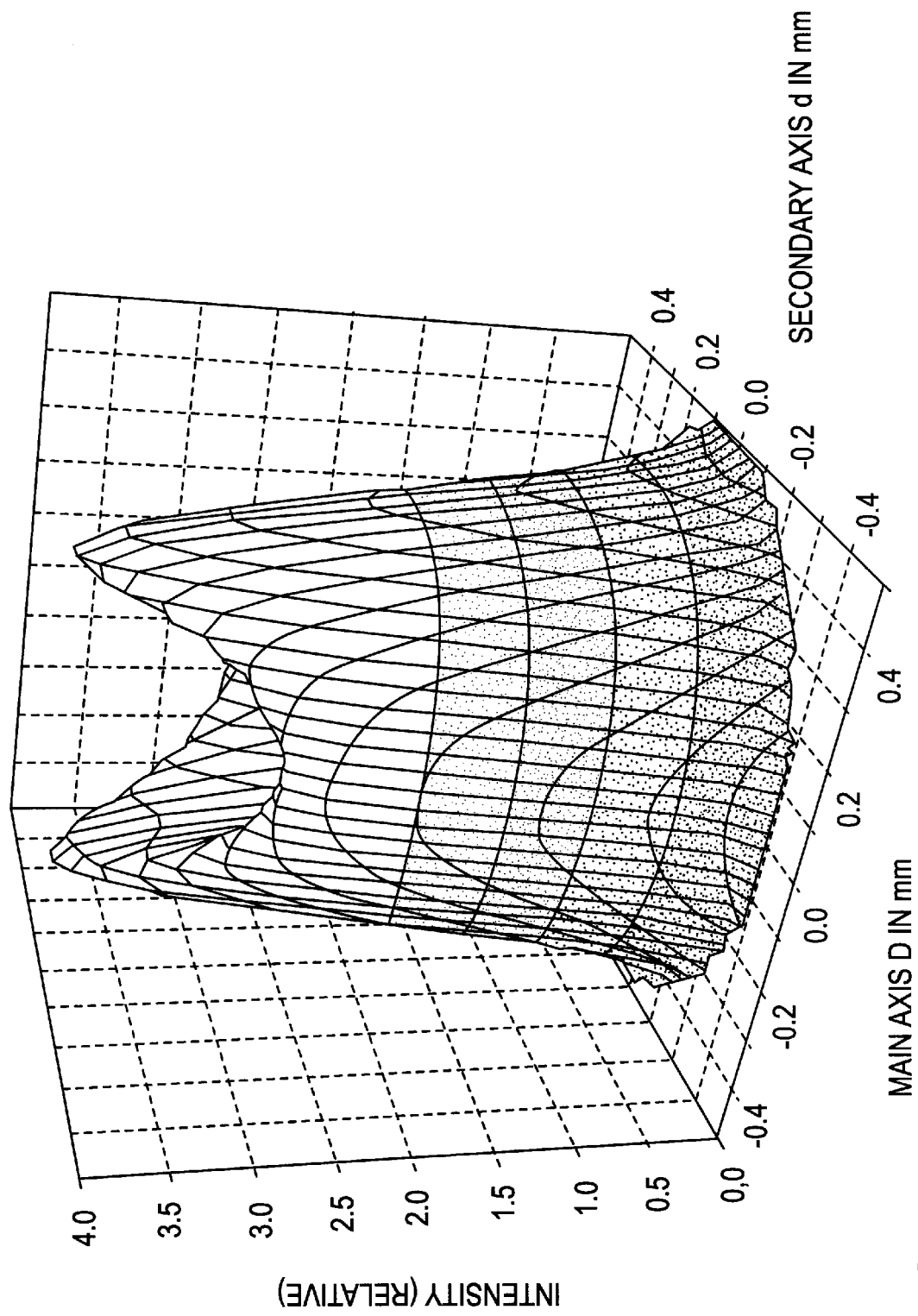

By means of the process according to the invention, welding can take place with the absolute minimum beam diameter that can be produced by the focussing or with a purposefully adjusted larger beam diameter. FIGS. 7a to 7c demonstrate examples of the large number of possible spot settings for welding by changing the axis deflection, starting from a Gauss profile that approximates actual use. For a clearer representation, the variation of the relationship of beam radius R and axis deflection D or d is shown in FIGS. 7a, 7b, and 7c without advancing motion (V=0). The parameters used are compiled in Table 2 below.

TABLE 2

Compilation of parameter combinations which were used in FIGS. 7a to 7c and 8a to 8c to represent the intensity distributions.

| | Gauss Intensity Distribution Variation of the relationship of beam radius R and axis deflection D or d. | | | Top Hat Intensity Distribution Variation of the relationship of speed n and advancing notion v | | |
|---|---|---|---|---|---|---|
| FIG. | 7a | 7b | 7c | 8a | 8b | 8c |
| radius R in mm | 0.175 | 0.175 | 0.175 | 0.25 | 0.25 | 0.25 |
| axis deflection D in mm | 0.1 | 0.3 | 0.6 | 0.061 | 0.061*) | 0.061*) |
| axis deflection d in mm | 0.07 | 0.21 | 0.42 | 0.04 | 0.04 | 0.04 |
| speed n in T rpm | 6,000 | 6,000 | 6,000 | 10,000 | 10,000 | 60,000 |
| advancing motion in m/min | 0 | 0 | 0 | 0 | 10 | 10 |

*)D in the advance direction

Among other things, FIGS. 7a to 7c demonstrate how a hollow beam is produced from the Gauss profile by rotation and by increasing the deflection (taper angle).

Figure 8A:
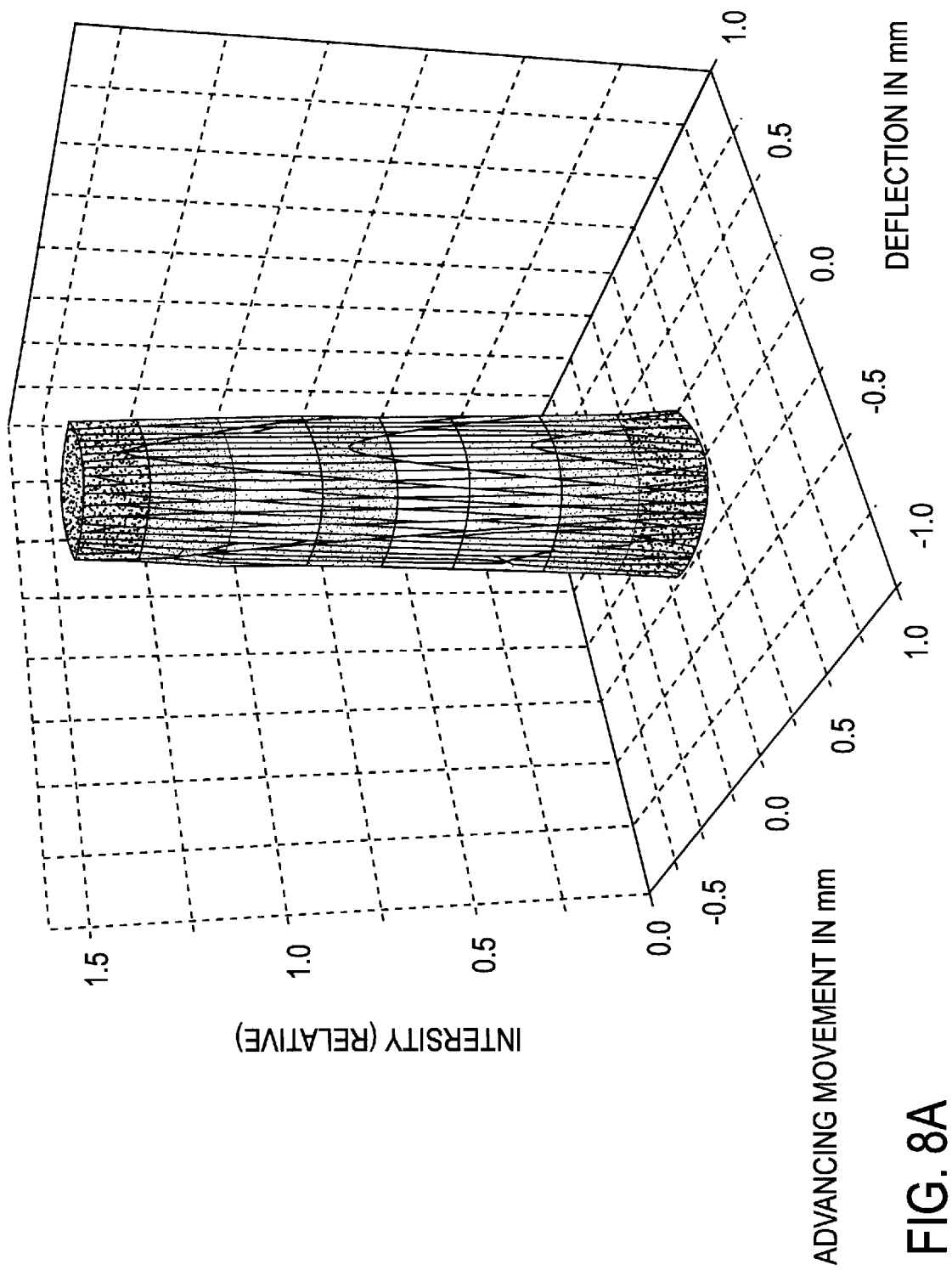
FIGS. 8a to 8c show a spot adjustment for welding with top hat intensity distribution and the significance of the relationship of speed and advance for the embodiment of weld quality.
Figure 8B:
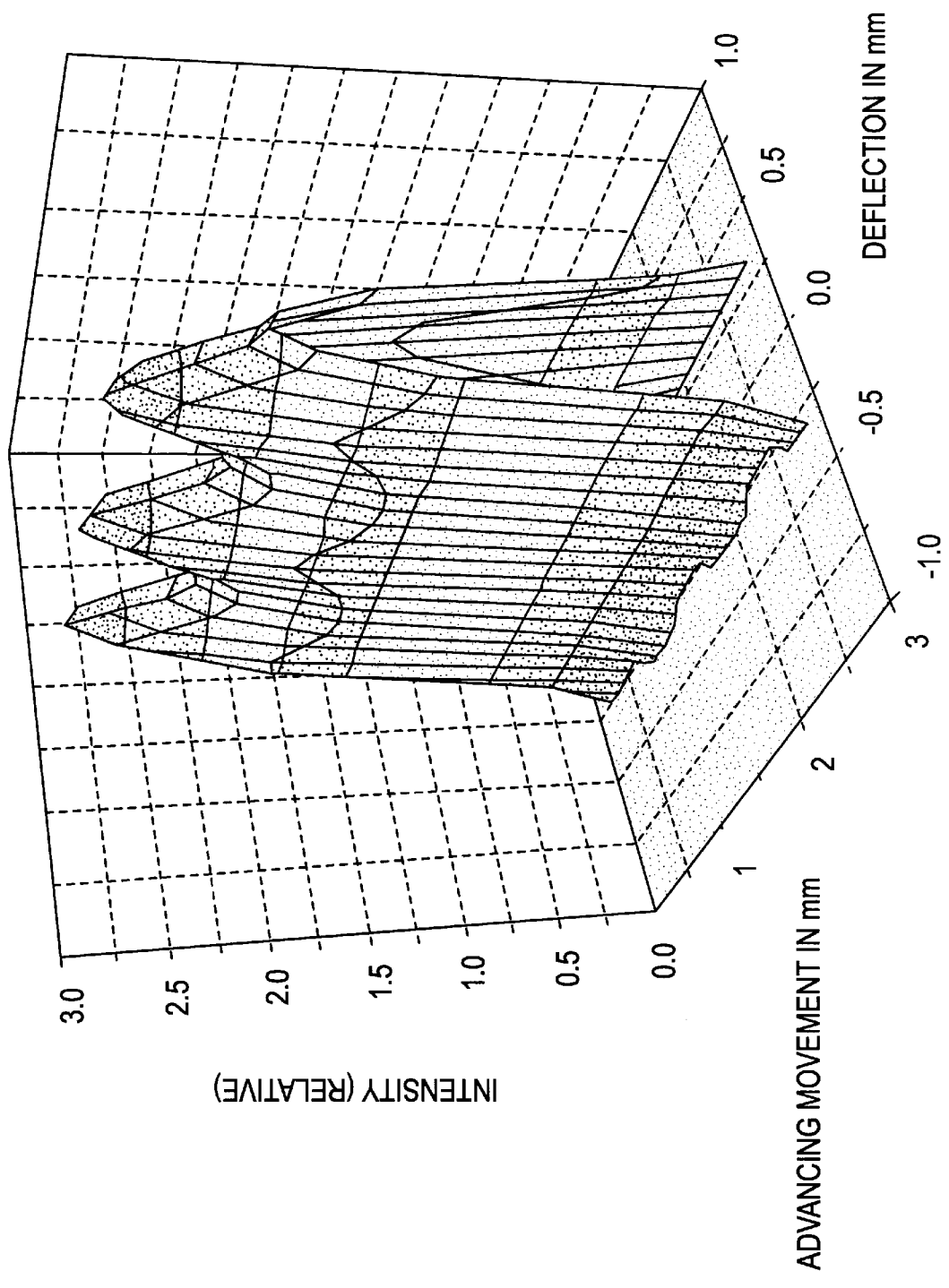
Figure 8C:
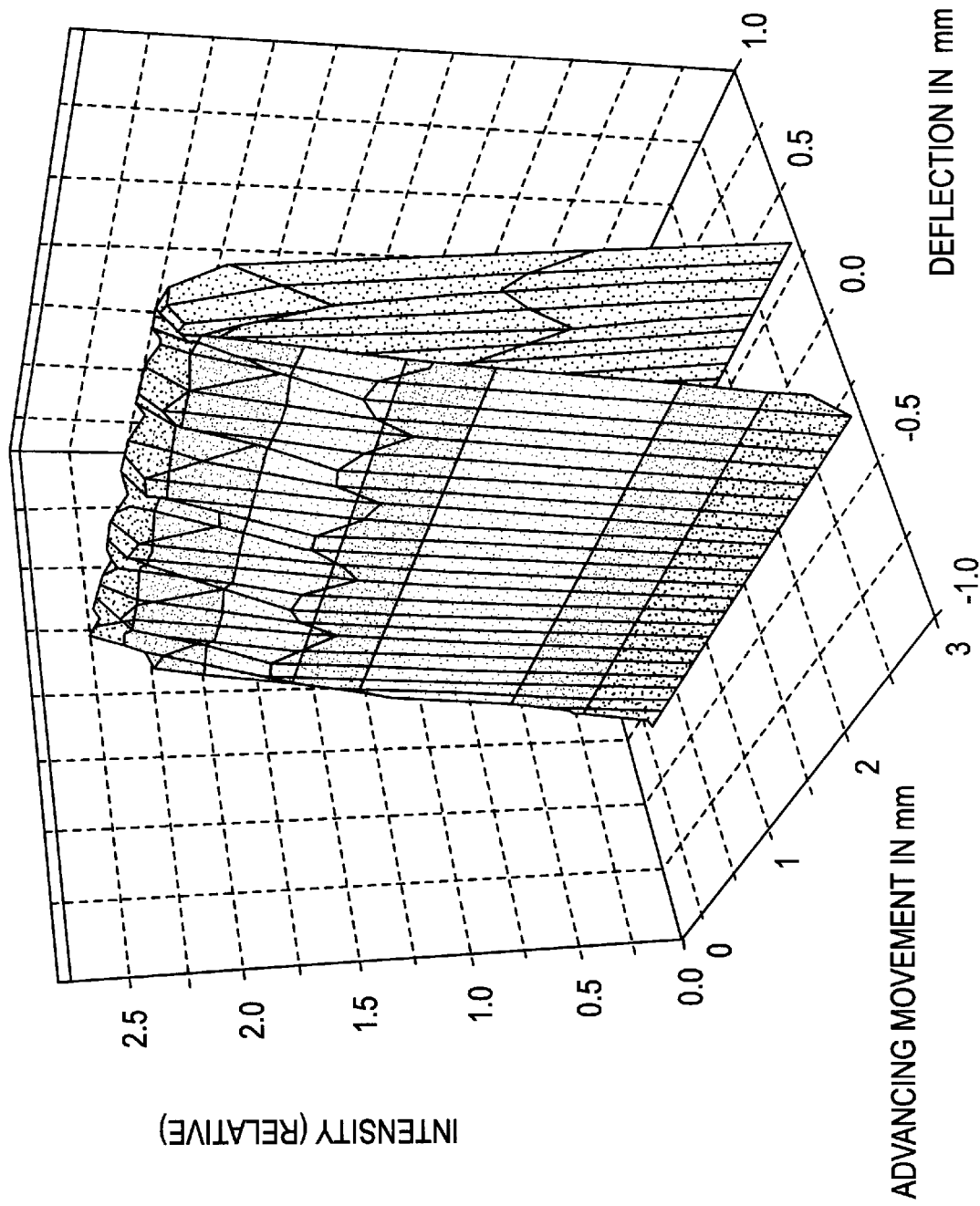

FIGS. 8a to 8c demonstrate how the relationship of speed n to advancing motion v determines the shape and course of the cycloid produced on the surface of the work piece. FIG. 8a shows the initial focus with a top hat intensity distribution. FIG. 8b shows the integral intensity distribution lengthwise to the welding track, which is produced at n=10 T rpm and v - 10 m/min. From the welding tests carried out, it becomes distinctly clear that fluctuations in the maximum intensity can lead to a periodic plasma ignition, where an even welding depth is not produced. In contrast, in FIG. 8c, where the speed has been increased to n=60 T rpm and the advancing motion has remained constant at v=10 m/min, the intensity distribution of the cycloid evened out, by means of which a stable welding plasma and consequently a weld with an even welding depth can be produced in the longitudinal direction.

With the device from FIG. 2 and the adjustment parameters from FIG. 8c, welds with a constant weld depth of 6.4 mm and a weld width of 3.3 mm could be produced in the material St 37 with a laser power of 4.5 kW. The welds have a lower number of pores with smaller pore sizes than welds produced with a static beam spot with comparable process parameters.

The stated goals mentioned with regard to exemplary embodiment 3 could be fulfilled with the beam shaping according to the invention.

Fourth Exemplary Embodiment

Figure 9A:
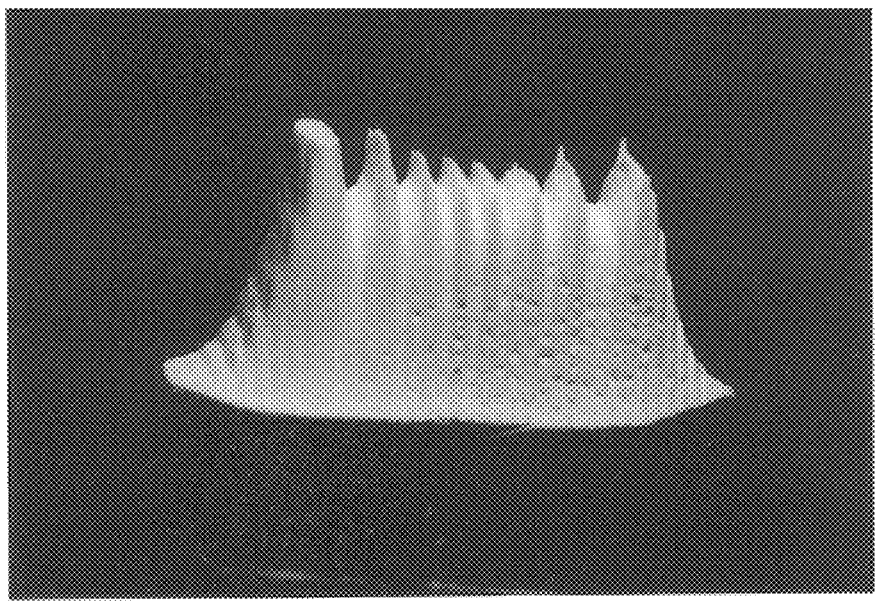
FIG. 9a shows a known spot adjustment of a linear focussing mirror with the critical intensity peaks for hardening without operation of the rotary mirror.
Figure 9B:
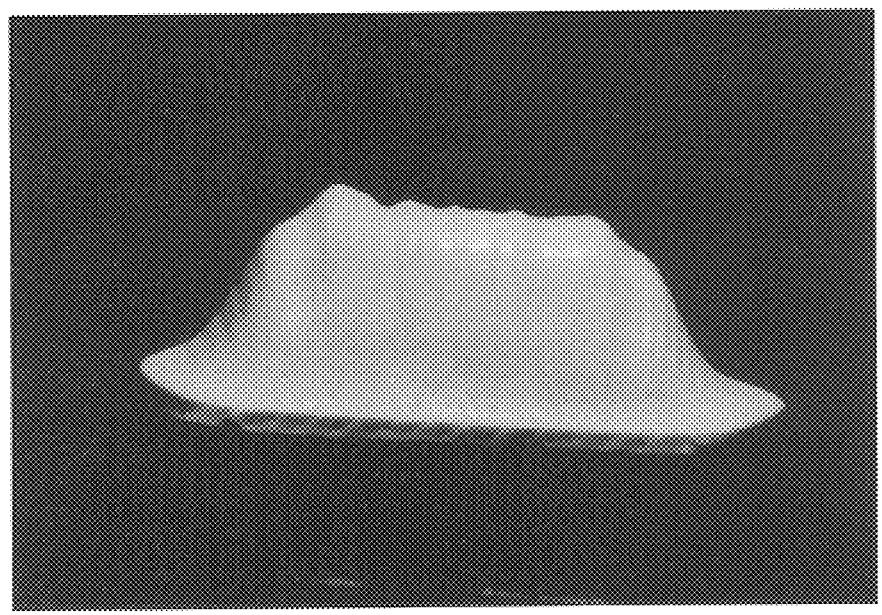
FIG. 9b shows the spot adjustment from FIG. 9a, with smoothed intensity peaks, for hardening by means of rotary mirror operation.
Figure 9C:
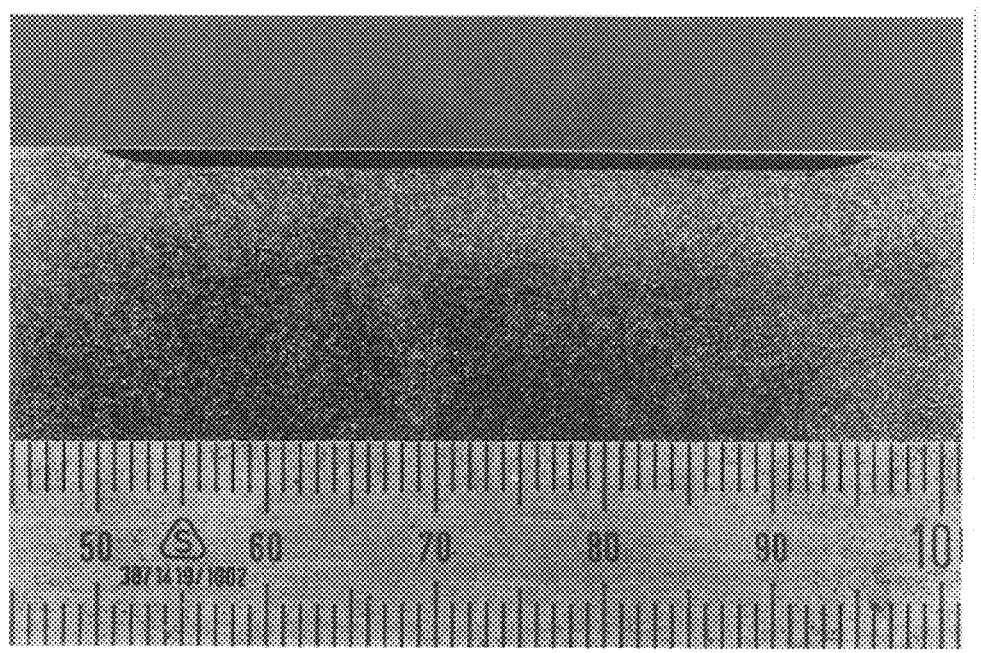
FIG. 9c shows the hardening result, a 46 mm wide, hardened track with a hardening depth of 1.1 mm, using the device described in FIG. 9b, i.e. hardening using the spot adjustment from FIG. 9a, with operation of the rotary mirror.

Specimen pieces of the material GG30 are surface hardened using the device shown in FIG. 2 and described in exemplary embodiment 1. With 5 kW laser power and a maximum allowable temperature of 1150° C., a track width of 46 mm should be hardened to a depth of 1.1 mm, with a beam spot axial ratio D:d=8:1 and with the advancing speed of 250 mm/min. These adjustment parameters were determined in advance with an optimization program. The axial ratio required for this is produced by a linear focussing mirror, with which a large beam spot can be produced that is approximately 49×7 mm$^2$ in size. The spot that can be produced with this static, linear focussing mirror is characterized by a large number of intensity peaks, as is demonstrated in FIG. 9a. These excesses lead to the fact that the maximum allowable surface temperature for the material is exceeded there and this leads to partial meltings. In order to prevent these meltings as a result of intensity, up till now, the above-mentioned surface temperature had to be reduced, which diminishes the achievable hardness result, as is known. Through the use of the process according to the invention for laser beam shaping, in particular by using the principle from FIG. 2 and the above-mentioned linear focussing mirror, the intensity peaks are reduced (smoothed), as shown in FIG. 9b. The above-mentioned optimized exposure parameters that are calculated ahead of time could be realized and as a result, the stated goal (see FIG. 9c), namely a hardening track 46 mm wide with a 1.1 mm conversion depth, can be achieved with the process according to the invention, without producing melts in the hardening track.

Fifth Exemplary Embodiment

Figure 10A:
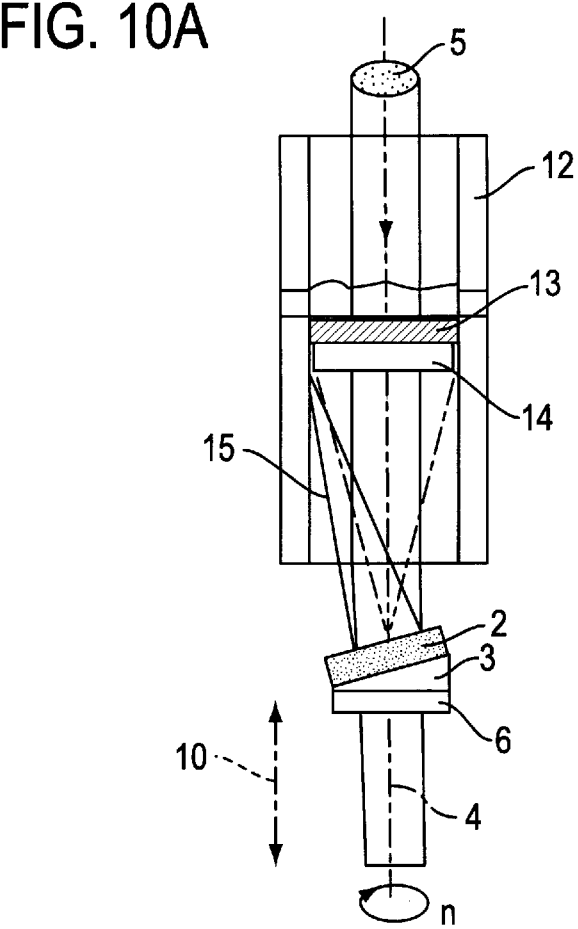
FIG. 10a shows the version of the device for inner wall hardening of pipes, where the static mirror 1 is eliminated and the rotary mirror 2 assumes all of the beam shaping.
Figure 10B:
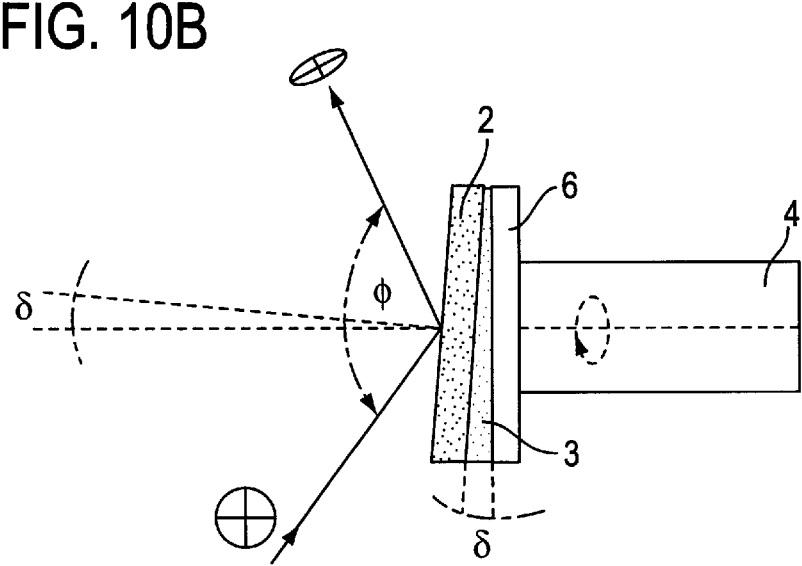
FIG. 10b shows the section of the version 10a of the device, with a representation of the change of the laser beam shape from the initial beam before striking the rotary mirror 2 to the spot after being reflected by the rotary mirror 2.

The version of the device according to exemplary embodiment 5 is shown in FIGS. 10a and 10b, where FIG. 10a shows the apparatus itself and FIG. 10b shows the changing of the laser beam shape before and after striking the rotary mirror 2.

In this exemplary embodiment, a possibility is mentioned of also using the embodiment according to the invention for hardening the inner walls of pipes, and to do so with definite hardness profiles, hardening tracks, and effective areas of the laser beam.

To that end, the laser beam 5 (laser power>10 kW) is guided through the pipe and after passing through the pipe, strikes the rotary mirror 2, which in this case is a focussing mirror with f=400 mm. Analogous to the preceding exemplary embodiments, the rotary mirror 2 is attached to a tapered disk 3, which is a tapered annular disk in this instance, and is anchored along with this to a receptacle 6 that is coupled to the turbine 4 via a shaft. The rotary mirror 2 is rotated via the turbine 4 at over 5,000 rpm and thus, taking into account the focussing cone 15 of the optics, an annular exposure zone 14 is produced on the inner wall of the pipe 12. In FIG. 10a, the already exposed and hardened inner pipe wall 13 is schematically depicted above the exposure zone 14. In contrast to the previous examples, in this instance, the static mirror 1 is completely eliminated and the advancing motion 10 is carried out here by the rotary mirror 2/tapered disk 3/receptacle 6/turbine 4 complex. FIG. 10b shows a variant of influencing laser beam shape. Incidentally, there is also the possibility here of influencing the hardness profile, the hardening track, and the effective area of the laser beam by means of the already-described variation of the angle φ and/or δ or the variation of the spacing 9 between the rotary mirror 2 and the specimen 7, i.e. in this instance, the section of the inner pipe wall struck by the laser.

With the version of the invention shown here, an inner pipe wall hardening with the required precision and under definite conditions is possible for the first time.

Sixth Exemplary Embodiment

Figure 11:
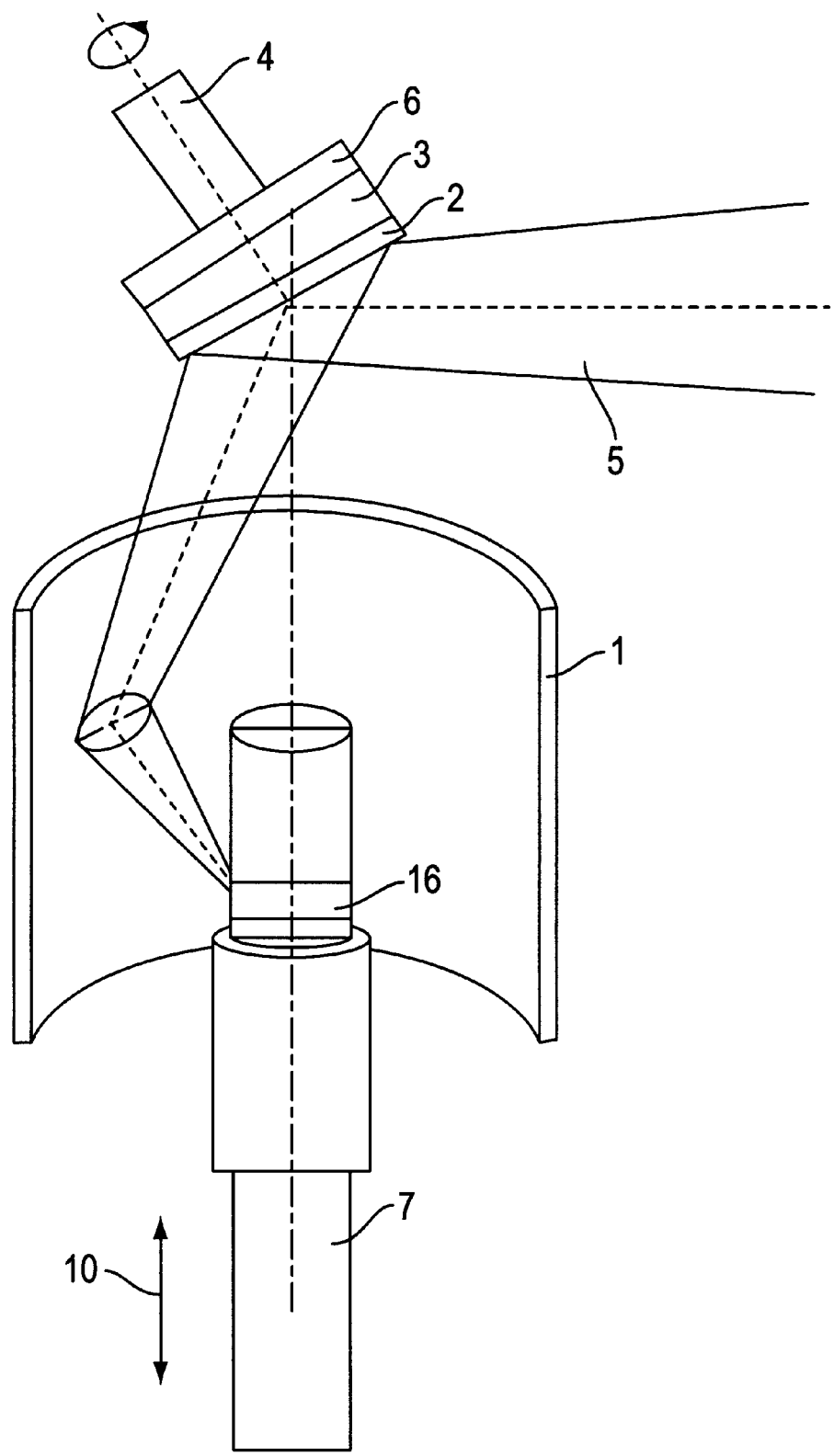
FIG. 11 shows the version of the device for hardening shafts and shaft ends.

The version of the device described in exemplary embodiment 6, with which primarily shafts and shaft ends can be hardened, is schematically represented in FIG. 11.

The laser beam (laser power>10 kW) strikes the rotary mirror 2, which, as already described, is attached to a tapered disk 3 and coupled along with this to the turbine 4 via the receptacle 6 and a shaft; in this case, the rotary mirror is a flat mirror made of copper and can be water-cooled. The rotary mirror is rotated at over 5,000 rpm. The laser beam, as shown in FIG. 7, is reflected by the beam-deflecting surface of the rotary mirror, which is tilted in relation to the rotational axis. This static, beam-shaping mirror 1 is embodied as a segment of a cylinder, whose inside is the mirror surface and which likewise can be water-cooled. The cylinder segment mirror 1 then reflects the beam onto the specimen 7, which was a shaft end in the example, where a continuous hardening of the surface is executed. The advancing motion 10 is carried out in this instance by the shaft end. In the version shown in FIG. 11, the shaft end is moved away from the mirrors 1, 2. Therefore, the already hardened and exposed shaft surface 16 is also noted beneath the effective area of the laser beam.

The influence of the hardness profile, the hardening track, and the effective area of the laser beam can be executed as described in the fifth exemplary embodiment.

With this version of the invention, shafts and shaft ends can be hardened for the first time with this precision and these potential variations.

We claim:

1. A process for laser beam shaping including directing a laser beam from a laser beam source toward the surface of an article to be treated, said process comprising:

directing said laser beam onto at least one rotary mirror that is rotatably supported about a rotational axis and selectively driven for rotation;

disposing a perpendicular to a beam deflecting surface of said rotary mirror inclined at a particular angle $\delta$ relative to the rotational axis of the rotary mirror;

deflecting said laser beam from said rotary mirror onto the treatment surface at a deflection angle $\phi$ to define an effective area of the deflected laser beam that includes an elliptical shape; and continuously changing the angle by which the beam deflecting surface of the rotary mirror is tilted in relation to the rotational axis during rotation of said rotary mirror.

2. The process according to claim 1, including disposing said rotary mirror at a preselected angle to define said particular angle $\delta$ by providing the rotary mirror with a tapered member.

3. The process according to claim 2, including replacing the tapered member with a different tapered member providing a different angle $\delta$ of inclination.

4. The process according to claim 1, including providing the laser with a power greater than 0.8 kW and cooling said at least one mirror.

5. The process according to claim 1, further including rotating said rotary mirror at a speed of at least about 10 rpm and no greater than about $10^5$ rpm.

6. The process according to claim 5, further including varying the speed of rotation of said rotary mirror to optimize the objective of a treatment operation utilizing the shaped beam.

7. The process according to claim 1, including rotating said rotary mirror by a turbine.

8. The process according to claim 1, utilized for laser surface hardening of large components.

9. The process according to claim 1, utilized for laser surface hardening of inner pipe walls.

10. A process according to claim 1, including providing one of a gas and solid-state laser, and the process is utilized for laser beam surface hardening of components.

11. A process according to claim 1, utilized for laser beam welding.

12. The process according to claim 1, further comprising providing at least one stationary mirror onto which the laser beam is first reflected before reflecting from the surface of said rotary mirror.

13. The process according to claim 12, further comprising providing said at least one stationary mirror as a parabolic mirror.

14. The process according to claim 1, further comprising varying said deflection angle $\phi$ to vary said effective area of the deflected laser beam.

* * * * *